United States Patent [19]
De Marco et al.

[11] 4,433,352
[45] Feb. 21, 1984

[54] DEVICE FOR RECORDING AND/OR READING BINARY DATA ON BOTH FACES OF A FLEXIBLE MAGNETIC DISK

[75] Inventors: Giuliano De Marco, Ivrea; Roberto Gemi, Turin, both of Italy

[73] Assignee: Ing. C. Olivetti & C., S.p.A., Ivrea, Italy

[21] Appl. No.: 279,625

[22] Filed: Jul. 1, 1981

[30] Foreign Application Priority Data

Jul. 14, 1980 [IT] Italy ............................... 68110 A/80

[51] Int. Cl.³ .......................... G11B 5/58; G11B 21/20
[52] U.S. Cl. ...................................... 360/105; 360/104
[58] Field of Search ................... 360/99, 103, 104, 105

[56] References Cited

U.S. PATENT DOCUMENTS

| | | | |
|---|---|---|---|
| 3,787,644 | 1/1974 | Schneider | 360/109 |
| 3,973,274 | 8/1976 | Morgan | 360/104 |
| 4,028,734 | 6/1977 | Mos | 360/104 |
| 4,247,877 | 1/1981 | Keller et al. | 360/105 |
| 4,306,258 | 12/1981 | Higashiyama et al. | 360/105 X |
| 4,306,260 | 12/1981 | Maeda et al. | 360/105 |
| 4,309,732 | 1/1982 | Kronfeld et al. | 360/104 |

FOREIGN PATENT DOCUMENTS 2948147  6/1980  Fed. Rep. of Germany ...... 360/104

OTHER PUBLICATIONS

IBM Tech. Disc. Bull., vol. 19, No. 5, Oct. 1976, Mueller, "Magnetic Stripe Reader/Writer with Improved Head Suspension", pp. 1808–1809.

*Primary Examiner*—Joseph A. Popek
*Attorney, Agent, or Firm*—Schuyler, Banner, Birch, McKie & Beckett

[57] ABSTRACT

The device comprises a carriage mobile radially relative to the disk, and on which lower and upper opposing magnetic heads are mounted, each for recording and/or reading a corresponding disk face. The upper magnetic head is resiliently mounted at the end of an arm pivoted to the carriage and is urged against the disk with a predetermined load determined by a spring. A flexible joint enables it to rotate in all directions about a central support. The lower magnetic head is connected to the carriage by means of a pair of parallel leaf springs which enable it to move along an axis normal to the plane of the disk without rotation, whereby both heads maintain good contact regardless of the height of the nominal plane of the disk.

8 Claims, 6 Drawing Figures

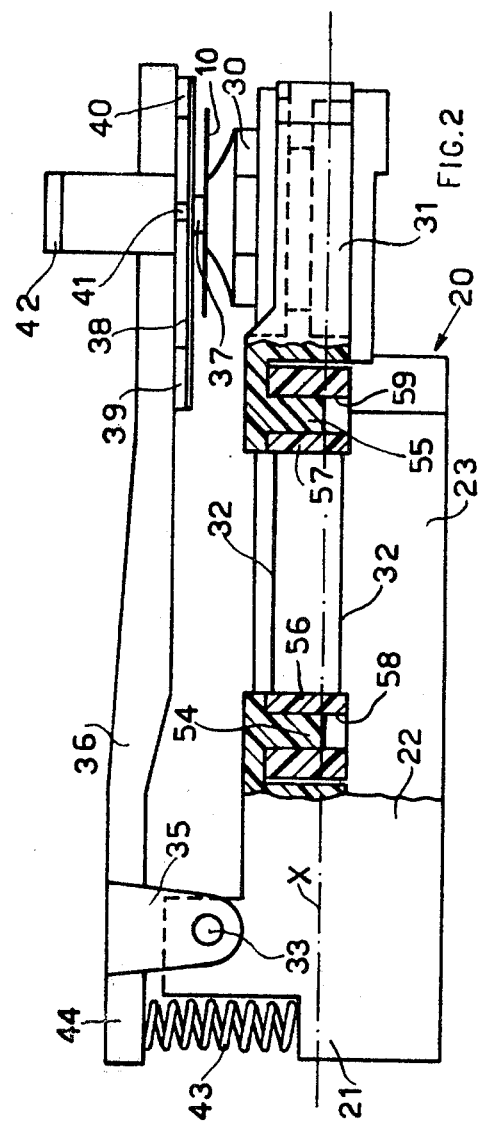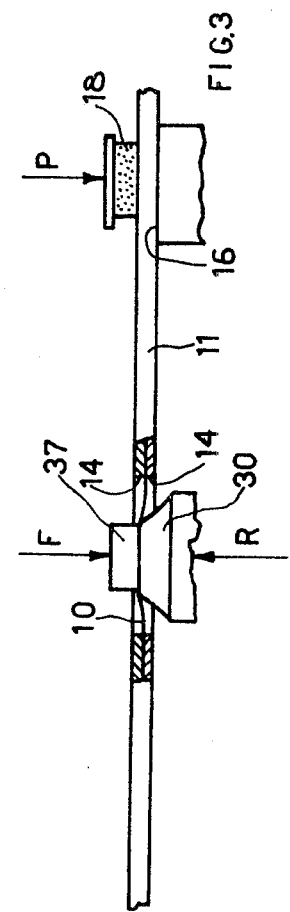

DEVICE FOR RECORDING AND/OR READING BINARY DATA ON BOTH FACES OF A FLEXIBLE MAGNETIC DISK

BACKGROUND OF THE INVENTION

This invention relates to a device for recording and/or reading binary data on both faces of a flexible magnetic disk, which may be contained in a cardboard or plastics sleeve. The magnetic disk is normally constituted by a thin plastics sheet coated on both sides with a layer of magnetisable material, and can rotate inside its sleeve by virtue of the presence of a lubricating material. The sleeve has a central through hole via which access can be gained to the magnetic disk from both sides in order to rotate it by drive means. The faces of the sleeve are provided with a pair of opposed slots disposed radially relative to the disk, through which access can be gained to the disk by means of the magnetic recording and/or reading heads.

Before bringing the magnetic heads into contact with the disk faces, the sleeve is urged by a presser against a fixed reference surface, in order to flatten the sleeve in a zone close to its radial slots, and thus position the disk in a nominal working plane.

A recording and/or reading device is known in which two arms disposed on opposite sides of the disk are pivoted to a carriage mobile radially along the axis of the sleeve slots, and are both movable between a rest position, in which they are spaced well away from the magnetisable surfaces of the disk, and a working position in which they are in proximity to the disk. A magnetic head is mounted by means of a very yieldable spring at the end of each arm, and can rotate in all directions about a central support. During reading and/or recording operations, the two opposing heads are kept in contact with the disk faces by means of a very small load, of about 8 grams. Because of this and the great yieldability of their springs, the magnetic heads are in theory free to follow every oscillation of the disk during its rotation, and can also move along an axis perpendicular to the plane of the disk, if this latter becomes disposed in a plane other than its nominal plane of rotation.

Beside requiring high precision in tests of its assembly and its setting in the apparatus in which it is mounted, this device has the drawback of causing excessive wear of the disk, in particular during the stage in which the heads "land" on the magnetised surfaces, and of providing very inconstant contact between the magnetic heads and the disk, and as a consequence a signal which is of non-uniform amplitude.

In another known device, the lower magnetic head is fixed on to the carriage, and its surface which makes contact with the disk is perfectly flat in order to define a reference surface against which the disk rests with its lower face.

The lower head is positioned on the carriage in such a manner that its flat surface is always above the nominal plane of rotation of the disk so that, during operation, the head "penetrates" into the disk, deforming it locally. A load of about 18 grams is applied to the upper head, which is of the type in the device described heretofore, and this tends to flatten the disk zone between the heads against the flat surface of the lower head. The lower head is therefore in an absolutely fixed position relative to the direction normal to the plane of the disk. Moreover, the disk can become positioned in planes other than the nominal plane because of the sleeve tolerances, and the tolerances of the entire recording and/or reading apparatus. The consequence is that this latter device has the drawback of very variable local deformation of the disk. Under marginal apparatus and disk conditions, due to variations in their friction coefficient and sleeve thicknesses, this causes inconstant head-disk contact, and a signal of non-uniform amplitude. Moreover, when this local deformation reaches the upper limiting level, there is considerable wear of the disk during its rotation.

SUMMARY OF THE INVENTION

The object of the present invention is to provide a device for recording and/or reading binary data on both faces of a flexible magnetic disk, in which the head-disk contact is always ensured and constant, in order to provide a recorded and/or read signal which is uniform in amplitude, and in which the heads do not subject the disk to wear during its rotation. The device according to the invention comprises means for supporting and rotating the disk, a carriage mobile radially relative to the disk, a first magnetic head resiliently mounted at the end of an arm pivoted to the carriage in order to bear against a first face of the disk, and a second magnetic head mounted in an opposed position to the first head in order to bear against a second face of the disk, wherein the second head is connected to the carriage by resilient means such as to allow it to move along an axis perpendicular to the plane of the disk, substantially without rotating.

BRIEF DESCRIPTION OF THE DRAWING

The invention will be described in more detail, by way of example, with reference to the accompanying drawings in which:

FIG. 2 is a partly sectional side view of the device of FIG. 1;

FIG. 3 is a section on the line 3—3 of FIG. 1;

DETAILED DESCRIPTION OF THE PREFERRED EMBODIMENT

Figure 6:
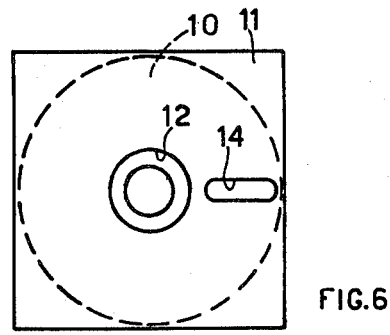
FIG. 6 is a diagrammatic plan view of a flexible magnetic disk of the type handled by the device.

The device embodying the invention can record and/or read binary data on both faces of a flexible magnetic disk 10 (FIG. 6) contained in a sleeve 11 which is substantially square and closed on all sides. The magnetic disk 10, known commercially as a "floppy disk" is constituted by a thin plastics sheet having a thickness of about 0.08 mm coated on both faces with a layer of magnetisable material a few microns thick, and can rotate in the sleeve 11 without damage, due to the presence of a lubricating material. A spindle of known type, not shown on the drawings, can engage with the disk 10 through a central hole 12 in the sleeve 11, and rotate it.

The sleeve 11 is also provided with a pair of opposed slots 14 (FIGS. 3 and 7) disposed radially to the disk 10. In the zone comprising the slots 14, the thickness of the sleeve 11 is about 1 millimeter. The apparatus which handle such flexible magnetic disks are conventionally provided with a fixed horizontal reference surface 16

Figure 1:
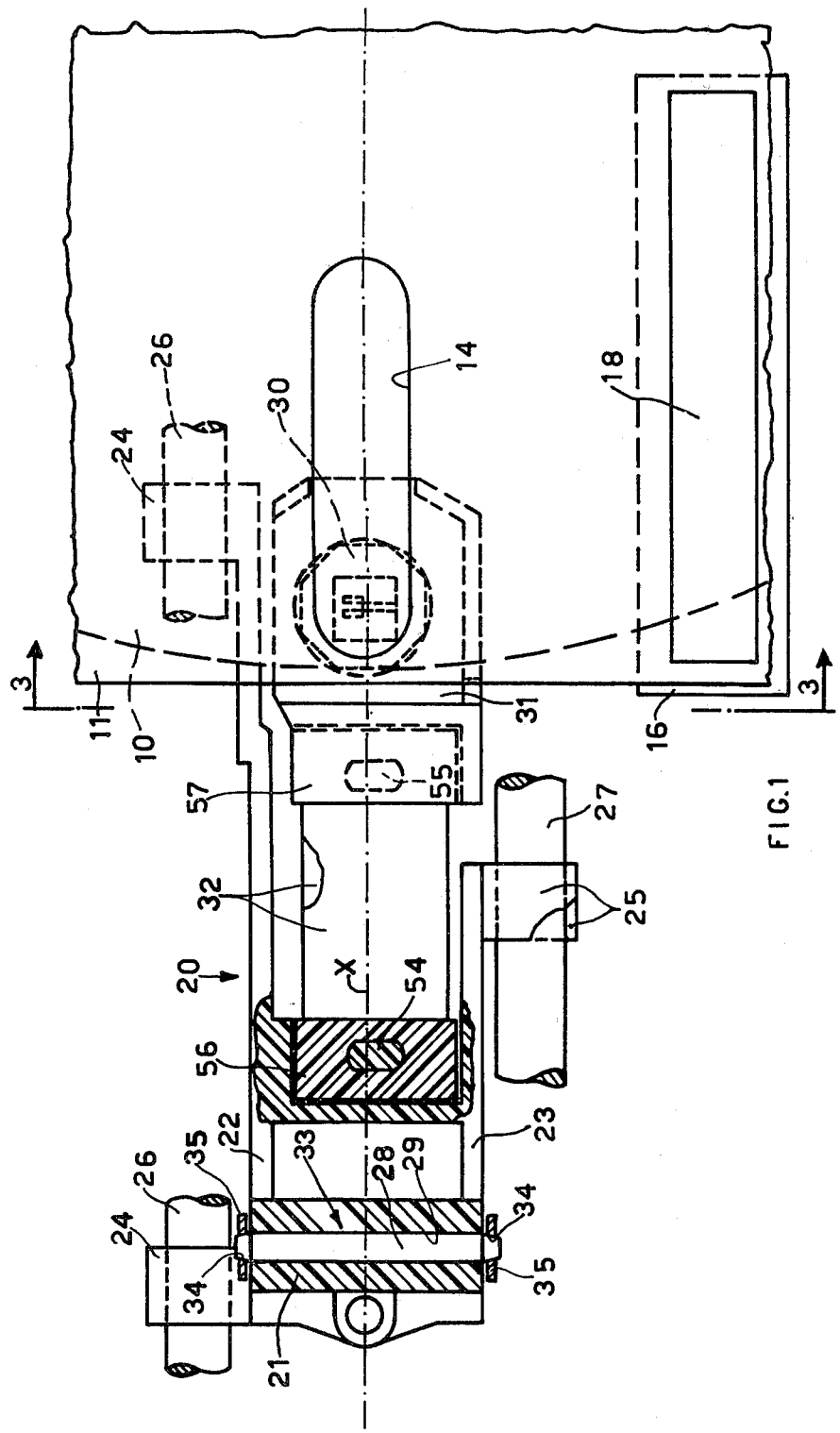
FIG. 1 is a partly sectional plan view of a device embodying the invention.
Figure 5:
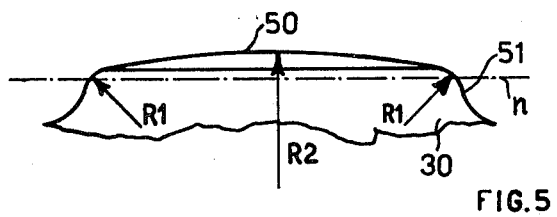
FIG. 5 is an enlarged detail of the device.

(FIGS. 1 and 3), on which the sleeve 11 rests. The sleeve is pressed down by a plate 18 with a force P of about 80 grams. The effect of the force P is that the sleeve 11 and disk 10 tend to become flattened and become disposed in a nominal working plane n, (FIG. 5). In particular, as one side of the sleeve has a thickness of about 0.45 mm with a tolerance of ±150 μm, the nominal theoretical plane n in which the lower face of the disk becomes disposed is 0.45 mm±150 μm higher than the plane of the reference surface 16.

The device embodying the invention (FIGS. 1 and 2) comprises a plastics carriage 20 with a rear body 21 (to the left of the figures) and two substantially parallel lateral arms 22 and 23. The carriage 20 is slidable on two cylindrical guides 26 and 27 along an axis x, radial with respect to the disk 10, by means of two bushes 24 integral with and projecting laterally from the arm 22, and a pair of guide lugs 25 integral with and projecting laterally from the arm 23. The carriage 20 is driven along the guides 26 and 27 in known manner, for example by means of an electric motor.

A magnetic head 30, which will be described in detail hereinafter, is cemented on to a plastics block 31 located in the front part of the carriage 20, and connected to the rear body 21 by means of two parallel leaf springs 32 disposed in a substantially horizontal plane when in their rest position. These springs 32 are about 20 mm long, and have a substantially linear elastic characteristic with a very low coefficient of elasticity, for example 0.015 mm/g. Springs 32, a magnetic head 30 and carriage 20 form a virtual articulated parallelogram. The assembly of the spring 32 will also be described in detail hereinafter.

An upper arm 36 is pivoted, by means of two lugs 35 thereof, on a pin 33 in the rear body 21, and its front end carries a further magnetic head 37 opposing the head 30. The pin 33 is of metal, and has its central cylindrical part 28 housed in a bore 29 in the rear body 21. The two ends of the pin 33 are conical, and each is housed in a corresponding bore 34 of the lugs 35, which have a diameter smaller than the central part 28 of the pin 33. The lugs 35 are of metal, and are resiliently urged towards the body 21 of the carriage 20 so as to totally take up the slack between their bores 34 and the conical ends of the pin 33.

A spring 38 of known type resiliently connects the head 37 to two projections 39 and 40 of the arm 36, in such a manner as to enable the head to rotate in any direction about a central support 41.

The arm 36 is also provided with a lateral lug 42, by means of which a control electromagnet, of known type and not shown on the drawings, can selectively move the upper magnetic head 37 away from the disk 10, or allow it to go towards the disk 10. A helical spring 43 compressed between the rear body 21 and a tail end 44 of the arm 36, tends to urge the head 37 downwards with a predetermined force F (FIG. 3) of about 15 grams.

The lower head 30 (FIG. 5) is of the type known as a "button head", with a central surface 50 which is normally in contact with the lower face of the disk, and which is connected to the base by means of an annular connection portion 51 having a radius $R_1$ of about 50 mm. In order to improve the head-disk contact and limit the wear of this latter, the surface 50 instead of being flat or hemispherical, as in the case of known heads, is cylindrical and has its generating lines parallel to the axis x. The radius of curvature $R_2$ of the surface 50 exceeds 100 mm and may be about 150 mm.

Figure 4:
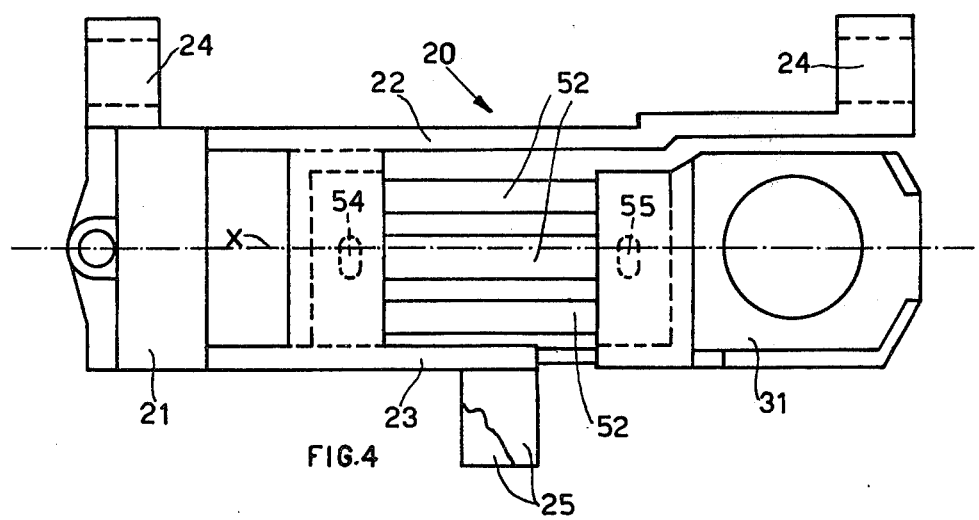
FIG. 4 is a plan view of a first detail of the device during a manufacturing stage.

The leaf springs 32 are assembled on the carriage 20 as follows. Initially, the block 31 (FIG. 4) is connected to the rear body 21 of the carriage 20 by means of four struts 52 parallel to the axis x, formed during the moulding of the carriage 20. In addition, during moulding, the body 21 is so profiled that it comprises a first centering pin 54 (FIG. 2), while the block 31 comprises a second centering pin 55.

The leaf springs 32 are embedded separately at their ends in two plastics blocks 56 and 57 of substantially parallelepiped shape, each comprising a central bore, 58 and 59 respectively. The two blocks 56 and 57 are then cemented one to the body 21 of the carriage 20 and the other to the front block 31. On being inserted into the bores 58, 59 respectively, the pins 54 and 55 position the springs 32 accurately relative to the body 21 and block 31.

After cementing the blocks 56 and 57, the struts 52 are removed, thus providing a resilient connection between the block 31 and body 21 of the carriage 20.

The operation of the device is as follows. When in the first position, and without the disk inserted into the apparatus, the lower magnetic head 30 is normally positioned such that the apex of its surface 50 is at a higher level than the theoretical nominal plane n (FIG. 5). This level is about 1 millimeter, but can vary between 0.3 mm and 2 mm, above the plane n and this is one of the characteristics of the device embodying the invention.

When a sleeve 11 containing a magnetic disk 10 is inserted into the apparatus on which the device is mounted, the lower head 30 comes into contact with the lower face of the disk 10. The weight of the disk 10 and of the sleeve 11 cause the lower head 30 to fall by about 0.1 mm.

The disk 10 (FIG. 1) is then rotated clockwise relative to the sleeve 11, which remains at rest. The carriage 20 is moved along the axis x radially with respect to the disk 10 until the head 30 is positioned on the required section on which binary data is to be recorded and/or read. The presser 18 is lowered, and the case 11 is pressed against the fixed horizontal reference surface 16. The disk 10 becomes flattened, to cause the lower head 30 to fall further by about another 0.1 mm. This value is related only to the pressure of the disk 10 on the head 30, and not to the mechanical dimensions of the sleeve, because of which any type of commercially known sleeve is always accepted by the device, without adversely influencing the head-disk position.

Immediately afterwards, the upper head 37 is brought into contact with the upper face of the disk 10. Under the action of the force F applied by the spring 43, the lower head 30 further falls by about 0.3 mm, and this force is balanced by the reaction R (FIG. 3) applied to the head 30 by the leaf spring 32.

From this, it is apparent that the level at which the heads 30 and 37 become positioned relative to the nominal working plane n of the disk 10 is exclusively a function of the forces F and R, and of the component of the force P in the zone of the heads, and is not strictly related to the mechanical dimensions of the apparatus and sleeve 11 relative to the carriage 20.

The penetration of the lower head 30 into the disk 10 varies according to the position in which the head 30 is located relative to the nominal plane n before inserting the disk 10 into the apparatus. In particular, the penetration varies under certain operating conditions between zero and 1.3 mm.

Moreover, this penetration also varies during operation, in that the unit formed by the two heads 30 and 37 pressed together by a force F of about 15 grams is resiliently connected to the fixed body 21 of the carriage 20, and this unit is therefore able to follow the oscillations of the disk 10 in a vertical direction.

A further characteristic of the device embodying the invention is that because of the parallelogram connection provided by the springs 32, the lower head 30 can move vertically, while always keeping the generating lines of the surface 50 parallel to the axis x. It is apparent that because of the elasticity of the leaf springs 32, small torsional movements of the lower head 30 are possible, but those are of an order of magnitude less than the movements due to the bending of the springs 32.

In this manner, because of the resilient connection of the lower head 30, the shape of the head 30, the variable penetration of the lower head 30 into the disk 10, and the load applied to the upper head, the contact between the magnetic heads 30 and 37 and the disk 10 is always ensured and constant, and the recorded and/or read signal is always uniform in amplitude. Moreover, as the lower head 30 adapts itself to the vertical oscillations of the disk 10, the wear of this latter is also very reduced.

What we claim is:

1. A device for recording and/or reading binary data on both faces of a flexible magnetic disk, comprising rotating means for rotating said disk, means for defining a nominal plane on which lies a first face of said disk, a carriage movable radially relative to said disk, a first magnetic head mounted on a support element for recording and/or reading binary data on said first face, said first magnetic head in a rest position interfering with said nominal plane of said disk by a predetermined amount, an arm having a first end pivoted with respect to said carriage and a second end movable towards a second face of said disk, a second magnetic head gimball mounted on the second end of said arm in an opposite position with respect to binary data on the second face of said disk, means for connecting said support element to said carriage in such manner that said support element and said first magnetic head can move only along an axis perpendicular to said nominal plane, said connecting means comprising a pair of leaf springs disposed parallel therebetween and substantially parallel to said nominal plane, each one of said leaf springs having a first extremity fixed to said carriage and a second extremity fixed to said support element, whereby said support element is cantilevered from said carriage and said two leaf springs, said carriage and said support element forming an articulated parallelogram, and urging means operating on said arm for urging said second magnetic head towards said second face of said disk with a predetermined load so as to modify in operation said predetermined amount of interference of said first magnetic head with said nominal plane.

2. A device as claimed in claim 1, wherein in said rest position the interference of said first magnetic head with said nominal plane lies between 0.3 mm and 2 mm, and wherein in operation the interference of said first magnetic head with said nominal plane of said disk lies between zero and 1.7 mm.

3. A device as claimed in claim 1, wherein said two springs have their extremities embedded in two plastic blocks which are cemented to said support element and said carriage respectively.

4. A device as claimed in claim 1, wherein said first magnetic head has a substantially cylindrical disk-engaging surface, and wherein the generating lines of said surface are parallel to the axis along which said carriage moves.

5. A device as claimed in claim 4, wherein the radius of curvature of said cylindrical surface exceeds 100 mm.

6. A device as claimed in claim 1, wherein said carriage and support element are of plastics material, are formed simultaneously, and are kept connected together by a plurality of struts which are removable after cementing said blocks.

7. A device as claimed in claim 1, wherein said arm is pivoted on said carriage by a pin which has a central cylindrical part housed in a bore in said carriage, and two conical ends engaged in bores of two corresponding support lugs of said arm.

8. A device as claimed in claim 7, wherein said lugs are flexible and are spread by said pivot pin in such a manner as to take-up the slack between said pin and said bores.

* * * * *

UNITED STATES PATENT AND TRADEMARK OFFICE
CERTIFICATE OF CORRECTION

PATENT NO. : 4,433,352
DATED : February 21, 1984
INVENTOR(S) : Guiliano De Marco and Roberto Gemi It is certified that error appears in the above—identified patent and that said Letters Patent is hereby corrected as shown below:

First page, Column 1, Assignee should read -- Ing. C. Olivetti & C., S.p.A., Ivrea (Torino), Italy and Elettronica Belmonte, S.a.s., Valperga (Torino), Italy --

Signed and Sealed this

Seventeenth Day of July 1984

[SEAL]

Attest:

GERALD J. MOSSINGHOFF

Attesting Officer     Commissioner of Patents and Trademarks